Patented July 12, 1927.

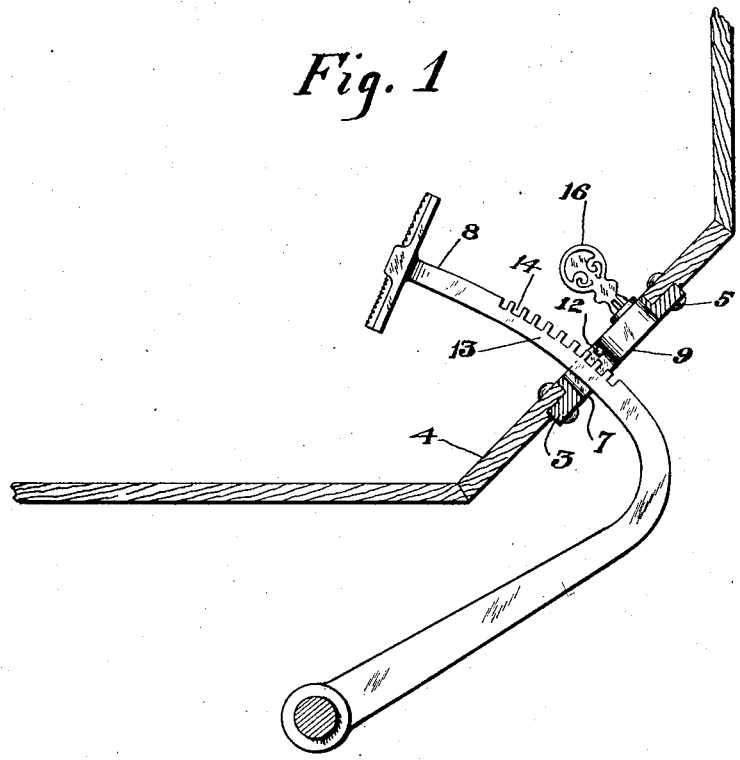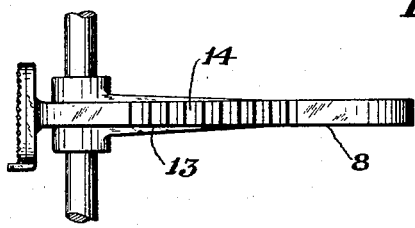

1,635,797

UNITED STATES PATENT OFFICE.

FRANK A. MIRANDE, OF SAN LEANDRO, CALIFORNIA.

AUTOMOBILE CLUTCH LOCK.

Application filed September 16, 1922. Serial No. 588,695.

My invention relates to means for locking the clutch or similar lever of an automobile in any desired position.

An object of the invention is to provide a clutch lock of simple character in which there are no loose or loosely attached members.

Another object of the invention is to provide a clutch lock in which practically the only member that must be manipulated is a key.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a side elevation, partly in section, of the device, showing it with the clutch lever in released position.

Figure 2 is a plan view of the clutch lever.

Heretofore most clutch locks of the general type to which mine is related, usually have had a large number of conspicuous and loose parts each of which had to be handled or manipulated when the person desired to release or engage the clutch lock. This feature not only required considerable time on the part of the person manipulating the device, but caused considerable annoyance when some of the loose parts were mislaid. In accordance with my device the clutch lever may be instantly locked in or released from any position by the use of but one member—a key.

Briefly expressed the clutch lock of my invention in its present embodiment comprises, a frame secured to the floor board of the automobile and provided with a central aperture through which the clutch lever moves. Fixed in the frame so as to lie flush with the floor-board is a lock having its bolt adapted to project into the frame opening engaged by the clutch lever. The portion of the clutch lever which moves through the frame opening is provided with a plurality of recesses any one of which may be engaged by the bolt so as to hold the clutch in any of the positions ranging from full engagement to complete disengagement. The bolt is protracted and retracted by the use of a key. It will thus be noted that the locking or releasing operation of the clutch lock requires practically no handling of any parts, with the exception of the key.

A detailed description follows:

As shown in the drawings the clutch lock of my invention comprises a frame 3 set in the floor-board 4 of the automobile flush with the upper surface, and held in place by rivets 5 preferably rendered difficult of removal. The frame is provided with a central opening 7 through which the clutch lever 8 moves when it is depressed or released for effecting the disengagement or engagement of the clutch members.

Fixed in the frame 3, preferably with its outer surface flush with the floor board, is a lock 9 provided with a bolt 12 which is arranged to protrude into the opening 7. Formed in the portion 13 of the clutch lever, which moves through the frame opening are a plurality of recesses or notches 14 any one of which may be engaged by the bolt 12 when the latter is in its protracted position. Thus if it is desired to lock the lever in the depressed or released position or in any position between them, it is merely necessary to move the bolt to engage in one of the notches while the lever is held in the desired position.

The bolt is adapted to be moved to a protracted or retracted position by means of a key 16, thus making the operation extremely simple and affording the necessary effectiveness with the use of but a minimum number of parts and of only one manipulating member.

It will be noted that with the lever locked in depressed position, the clutch members will be disengaged and transmission of power from the engine to the wheels will be prevented, although the automobile is free to be moved by an extraneous force if necessary, as in case of fire or other emergencies.

It will further be noted that since the upper surface of the frame and lock is flush with the corresponding surface of the floor board, the device of my invention is extremely neat in appearance, unobstrusive and not liable to be readily broken.

I claim:

1. In an automobile clutch lock, a clutch lever provided on one side with a plurality of recesses aligned in an arc having the pivot point of said lever as its center, a key lock fixed solely to the floor board of the automobile and provided with an opening through which the recessed portion of said lever is adapted to be reciprocated longitudinally of said arc, and a bolt in said lock positioned opposite said recesses and adapted to be engaged in any one thereof.

2. In an automobile, a pivoted clutch lever provided with an arcuate portion having its center of curvature at the pivot point of the lever, and provided with notches at the outer edge thereof, a member providing an aperture through which said lever portion is arranged to be longitudinally reciprocated, and a key operated bolt lock mounted on said member and arranged to have the bolt thereof projected in the plane of movement of said lever to engage any one of said notches.

In testimony whereof, I have hereunto set my hand at Oakland, this 21st day of Aug. 1922.

FRANK A. MIRANDE.